No. 786,460. PATENTED APR. 4, 1905.
J. W. PAIGE.
FEED MECHANISM FOR CORN HUSKING AND SHREDDING MACHINES.
APPLICATION FILED JUNE 4, 1904.
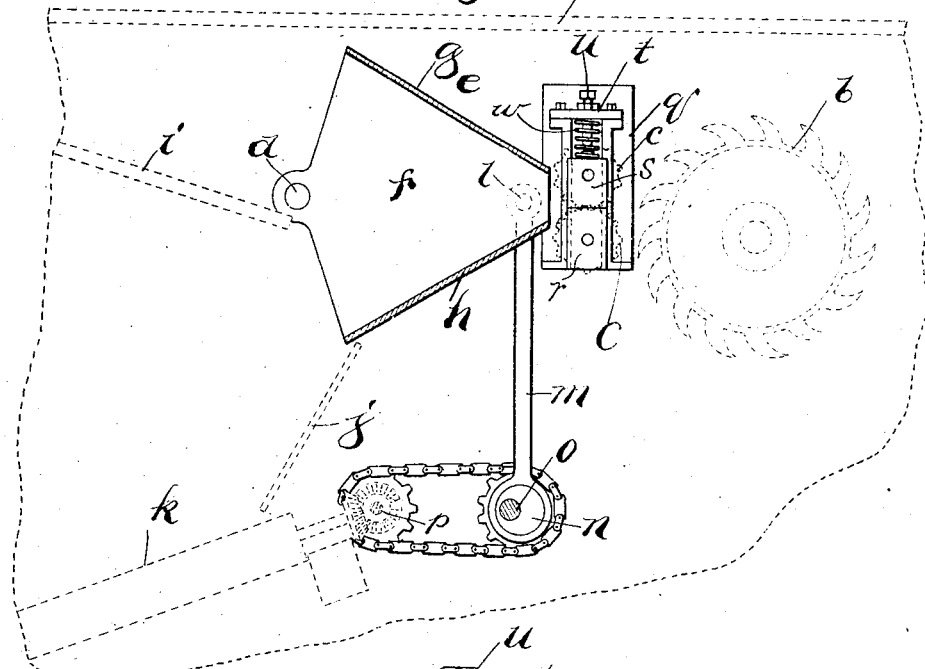
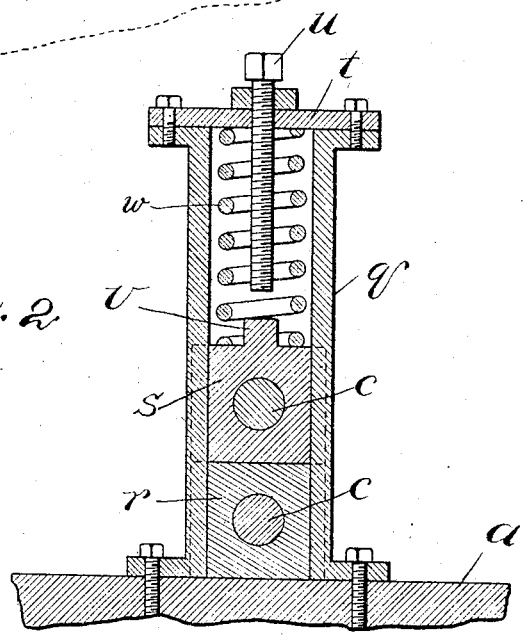
Witnesses:
J. B. Weir
G. T. Dougarus.
Inventor:
James W. Paige
By Dwind H. Fletcher
his Atty.

No. 786,460. Patented April 4, 1905.

UNITED STATES PATENT OFFICE.

JAMES W. PAIGE, OF CHICAGO, ILLINOIS, ASSIGNOR TO ALBERT VAN NESS, OF ROCHESTER, INDIANA.

FEED MECHANISM FOR CORN HUSKING AND SHREDDING MACHINES.

SPECIFICATION forming part of Letters Patent No. 786,460, dated April 4, 1905.

Application filed June 4, 1904. Serial No. 211,154.

*To all whom it may concern:*

Be it known that I, JAMES W. PAIGE, a citizen of the United States, residing at Chicago, in the county of Cook and State of Illinois, have invented certain new and useful Improvements in Feed Mechanism for Corn Husking and Shredding Machines, of which the following is a description, reference being had to the accompanying drawings, forming a part of this specification, in which corresponding letters of reference in the different figures indicate like parts.

The primary object of my invention is to provide a simple and effective means for agitating the stalks of corn as they are fed to the snapping-rolls of a corn husking and shredding machine in order to prevent clogging and to insure a uniform and continuous passage thereof.

A further object is to provide means for adjusting the feed-rolls so that the extent of separation thereof may be varied without changing the initial pressure of the springs, while a positive resistance may be offered to the further separation of the rolls after reaching a given predetermined limit, all of which is hereinafter more particularly described, and definitely pointed out in the claims.

In the drawings, Figure 1 is a longitudinal vertical sectional view of a portion of a corn husking and shredding machine embodying the features of my invention, and Fig. 2 is an enlarged central vertical sectional view of the housing and mechanism for adjusting the feed-rolls.

Referring to the drawings, $a$ represents the usual frame or casing of the machine in suitable bearings, in which is journaled the shredding-cylinder $b$ and feed or snapping rolls $c\,c$, all of well-known construction, except the adjusting mechanism for the snapping-rolls, which will be hereinafter referred to. Pivoted at $d$ upon opposite sides of the frame or casing and inclosed within the latter is a feed-chute, generally designated by $e$, having end walls $f$ adjacent to and parallel with the casing, and converging top and bottom walls $g\,h$, the converging ends of which are located close to the snapping-rolls $c$, the ends of said top and bottom walls next to the rolls being preferably at such distance from each other that when said chute is in the position shown in Fig. 1 said parts will lie in the horizontal planes, respectively, of the axes of said rolls, or substantially so. An inclined feeding-table $i$ is supported stationarily in the framework of the machine in any well-known way, so that the lower end shall be near or by preference slightly below the level of the pivotal point $d$ of the chute. The flare of the parts $g$ and $h$ may be varied; but it is of importance that that of the part $h$ should be such as to cause it to incline downwardly to a sufficient degree, so that the ears of corn when separated by the snapping-rolls may slide downwardly thereon and thence over an apron $j$ to the usual husking-rolls $k$. The upward flare of the part $g$ should be such as to enable the cornstalks to readily enter the chute without obstruction. Pivoted to a wrist-pin, as shown at $l$, upon opposite sides of the chute $e$ at or near its free end are pitmen $m$, one only of which is shown, the lower end of which is connected to an eccentric $n$, mounted upon a shaft $o$, said shaft being driven by means of pulleys and a suitable belt connected with a shaft $p$, which drives the husking-rolls $k$. As the shaft $o$ is rotated the free end of the chute $e$ is vibrated vertically, thereby imparting a continuous shaking movement to the cornstalks as they are fed to the rolls, which effectually prevents said stalks from becoming clogged. It is desirable that the snapping-rolls should be of small diameter in order to avoid shelling the corn, and when larger stalks are introduced the rolls frequently grind thereon without drawing in the stalk. If, however, some means is provided for agitating the stalk it will readily be drawn in without obstruction. My improved funnel-shaped vibratory chute is especially effective for this purpose in that it offers no obstruction to the passage of the stalks. The extent of vibration need not be great. Ordinarily I would recommend a movement of about one inch.

It is of importance that the spring-pressure upon the feed-rolls be comparatively light, so that they may readily yield to receive the stalks, but that said yielding movement after the entry of the stalk should be limited by positive means and that so adjustable as to provide for heavy or light stalks. This result may be accomplished as follows: Rigidly bolted to the frame are housings $q$, having the usual bearing-blocks $r$ $s$, secured in vertical guideways therein and adapted to serve as bearings for the feed or snapping rolls $c$ $c$. A plate $t$ is bolted to the top of the housing $q$, through which is tapped a set-screw $u$, the lower end of which is adapted to bear upon a boss $v$, Fig. 2, formed upon the block $s$. A coiled spring $w$ is interposed between said bearing-block and the plate $t$. The set-screw is adjusted so as to permit a separation of the rolls sufficient to conform to the average size of the stalks which may be fed at a given time. As the stalks enter the rolls the latter readily separate to receive them; but the extent of separation is limited by contact between the set-screw and the part $v$.

From the foregoing it will be seen that the separation of the rolls may be adjusted to the character of the stalks, while the initial spring-pressure remains unchanged. This is a great advantage over the method heretofore employed of adjusting the tension of the springs without interposing a positive limit to the movement of the rolls.

Having thus described my invention, I claim—

1. The combination with the feed-rolls of a corn-shredding machine, of a funnel-shaped chute pivoted at its receiving end and provided with means at the end adjacent to the feed-rolls for imparting a vibratory movement to said chute up and down in front of said rolls.

2. The combination in a machine of the class described, of feed-rolls, a stationary feed-table, a funnel-shaped feed-chute interposed between said table and said rolls, said feed-chute being pivoted upon a horizontal axis, and means for imparting a vibratory up-and-down movement to the end thereof next to said rolls.

3. The combination in a machine of the class described, of feed-rolls, a stationary feed-table, a funnel-shaped feed-chute interposed between the end of said table and said rolls, the large end of said chute being pivoted near to and in advance of said table, and means for vibrating the free end of said chute across the plane of the meeting-faces of said rolls.

4. The combination in a machine of the class described, of a feed-table, a funnel-shaped feed-chute pivotally mounted in advance of said table, the top and bottom walls thereof diverging rearwardly, one above and the other below the plane of said table, feed-rolls in operative proximity to the mouth of said chute, and means for vibrating the free end of said chute in front of said feed-rolls.

5. A feed mechanism of the class described, consisting of a stationary feed-table, a vibratory funnel-shaped feed-chute in advance thereof, and feed-rolls in operative proximity to the mouth of said feed-chute, the lower wall or bottom of said feed-chute being inclined downwardly and rearwardly to direct the severed ears of corn to the husking-rolls.

In testimony whereof I have signed this specification, in the presence of two subscribing witnesses, this 30th day of May, 1904.

JAMES W. PAIGE.

Witnesses:
D. H. FLETCHER,
C. E. JORDAN.